(12) United States Patent
Nishimura

(10) Patent No.: US 11,786,814 B2
(45) Date of Patent: *Oct. 17, 2023

(54) METHOD FOR PROVIDING A GAME, RECORDING MEDIUM AND SERVER

(71) Applicant: GREE, INC., Tokyo (JP)

(72) Inventor: Kentaro Nishimura, Tokyo (JP)

(73) Assignee: GREE, INC., Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 17/709,278

(22) Filed: Mar. 30, 2022

(65) Prior Publication Data

US 2022/0219080 A1    Jul. 14, 2022

Related U.S. Application Data

(63) Continuation of application No. 16/890,256, filed on Jun. 2, 2020, now Pat. No. 11,318,380, which is a
(Continued)

(30) Foreign Application Priority Data

Jun. 20, 2013 (JP) ................. 2013-129889

(51) Int. Cl.
*A63F 13/35* (2014.01)
*A63F 13/332* (2014.01)
*A63F 13/85* (2014.01)

(52) U.S. Cl.
CPC ............ *A63F 13/35* (2014.09); *A63F 13/332* (2014.09); *A63F 13/85* (2014.09); *A63F 2300/575* (2013.01)

(58) Field of Classification Search
CPC ........ A63F 13/45; A63F 13/533; A63F 13/60; A63F 13/69; A63F 13/70; A63F 13/77; A63F 13/79
See application file for complete search history.

(56) References Cited

U.S. PATENT DOCUMENTS 9,770,656 B2    9/2017  Nishimura
2009/0247251 A1  10/2009  Ito et al.
(Continued)

FOREIGN PATENT DOCUMENTS

JP    2007-159912    6/2007
JP    2009-233217    10/2009
(Continued)

OTHER PUBLICATIONS

Patent Abstracts of Japan for JP 2013-138715, published Jul. 18, 2013, 1pg.
(Continued)

*Primary Examiner* — Omkar A Deodhar
(74) *Attorney, Agent, or Firm* — Oblon, McClelland, Maier & Neustadt, L.L.P.

(57) ABSTRACT

A method for providing a game in which a plurality of missions is presented to a user device each time a certain period has elapsed from a server having a storage unit for storing user information relating to a plurality of users, includes the steps of generating a plurality of different missions for each of the plurality of users based on the user information stored in the storage unit, presenting a list of the generated missions for each of the users on the user device, and presenting an operational element for updating a mission included in the presented list to another mission regardless of the elapse of the period in accordance with the progress of presented missions.

20 Claims, 10 Drawing Sheets

Related U.S. Application Data continuation of application No. 16/133,274, filed on Sep. 17, 2018, now Pat. No. 10,709,976, which is a continuation of application No. 15/684,241, filed on Aug. 23, 2017, now Pat. No. 10,086,281, which is a continuation of application No. 14/987,412, filed on Jan. 4, 2016, now Pat. No. 9,770,656, which is a continuation of application No. 14/109,704, filed on Dec. 17, 2013, now Pat. No. 9,272,222.

(56) References Cited

U.S. PATENT DOCUMENTS

| | | |
|---|---|---|
| 2010/0197409 A1 | 8/2010 | Van Luchene |
| 2011/0263322 A1 | 10/2011 | Van Luchene |
| 2012/0122552 A1 | 5/2012 | Youm |
| 2012/0283024 A1 | 11/2012 | Van Luchene |
| 2013/0337912 A1 | 12/2013 | Urakubo et al. |
| 2014/0214506 A1 | 7/2014 | Van Luchene |

FOREIGN PATENT DOCUMENTS

| | | |
|---|---|---|
| JP | 5118261 | 10/2012 |
| JP | 5155440 | 12/2012 |
| WO | 2013/099349 A1 | 7/2013 |

OTHER PUBLICATIONS

English translation of Office action dated Sep. 3, 2013 in corresponding Japanese Application No. 2013-129889, disclosing the relevant parts/pages of the above—identified references; 4pp.

Partial English translation of Office action dated Apr. 1, 2014 for corresponding patent application No. JP 2013-269842, 4pp.

Sekaiju no Meiq III Seikai no Riahousya Official Masters Guide, ENTERBRAIN Inc., First edition, pp. 005, 143, published May 11, 2010 including English excerpt from Office action, 6pp.

Macross 30 The Voice that Connects the Galaxy, Weekly FAMITSU, ENTERBRAIN, Inc., vol. 28, No. 1, pp. 72 to 75, published Dec. 20, 2012, including English excerpt from Office Action, 8pp.

Dragon's DOGMA, FAMITSU Xbox 360, ENTERBRAIN Inc., vol. 11, No. 7, pp. 036 to 043, published May 30, 2012, including English excerpt from Office action, 12pp.

Final Fantasy XIV Corpus of Battlecraft leves & Disciples of Land, Monthly FAMITSU Connect! On, ENTERBRAIN, Inc., vol. 1, No. 2, pp. 33 to 37, published Feb. 26, 2011 including English excerpt from Office action, 8pp.

Final Fantasy Tactics A2 Grimoire of the Rift Official Complete Guide, Square Enix Co., Ltd, p. 224, Dec. 24, 2007 (First Printing), Dec. 5, 2008 (Second Printing) including English excerpt from Office action, 5pp.

Petition for Post-Grant Review of U.S. Pat. No. 9,770,656 dated Jun. 22, 2018.

Petition for Post-Grant Review of U.S. Pat. No. 9,770,664 dated Jun. 22, 2018.

Patent Owner's Preliminary Response Pursuant to 37 CFR § 42.207(a), filed in Post Grant Review (Case No. 2018-00070) of U.S. Pat. No. 9,770,656, Oct. 17, 2018, 86 pages.

Declaration of Michael Shamos, filed as Exhibit 2001 in Post Grant Review (Case No. 2018-00070) of U.S. Pat. No. 9,770,656, Oct. 17, 2018, 118 pages.

Bauckhage et al., "How Players Lose Interest in Playing a Game: An Empirical Study based on Distributions of Total Playing Times," filed as Exhibit 2002 in Post Grant Review (Case No. 2018-00070) of U.S. Pat. No. 9,770,656, Oct. 17, 2018, 8 pages.

Patent Owner's Preliminary Response Pursuant to 37 CFR § 42.207(a), filed in Post Grant Review (Case No. 2018-00071) of U.S. Pat. No. 9,770,664, Oct. 25, 2018, 69 pages.

Declaration of Michael Shamos, filed as Exhibit 2001 in Post Grant Review (Case No. 2018-00071) of U.S. Pat. No. 9,770,664, Oct. 25, 2018, 104 pages.

Bauckhage et al., "How Players Lose Interest in Playing a Game: An Empirical Study based on Distributions of Total Playing Times," filed as Exhibit 2002 in Post Grant Review (Case No. 2018-00071) of U.S. Pat. No. 9,770,664, Oct. 25, 2018, 8 pages.

Hynninen, "First-Person Shooter Controls on Touchscreen Devices: a Heuristic Evaluation of Three Games on the iPod Touch", filed as Exhibit 2003 in Post Grant Review (Case No. 2018-00071) of U.S. Pat. No. 9,770,664, Oct. 25, 2018, 68 pages.

Ziaeehezarjeribi, "Learning Strategies in Play During Basic Training for Medal of Honor and Call of Duty Video Games," filed as Exhibit 2004 in Post Grant Review (Case No. 2018-00071) of U.S. Pat. No. 9,770,664, Oct. 25, 2018, 201 pages.

Vicencio-Moreira et al., "The Effectiveness (or Lack Thereof) of Aim-Assist Techniques in First-Person Shooter Games," filed as Exhibit 2005 in Post Grant Review (Case No. 2018-00071) of U.S. Pat. No. 9,770,664, Oct. 25, 2018, 10 pages.

Statutory Disclaimer under 35 U.S.C. § 253(a), filed as Exhibit 2006 in Post Grant Review (Case No. 2018-00071) of U.S. Pat. No. 9,770,664, Oct. 25, 2018, 14 pages.

Decision Denying Institution of Post-Grant Review 35 U.S.C. § 324(a), Uited States Patent and Trademark Office,(Case No. PGR2018-00070) of U.S. Pat. No. 9,770,656 B2, Jan. 16, 2019, 12 pages.

FIG. 4A

| USER ID | NAME | LEVEL | PRESENTED MISSION ID | UNCLEARED MISSION ID | CLEARED MISSION ID | ACQUIRED ITEM ID | PREVIOUS FINISHING DATE AND TIME | FRIEND ID |
|---|---|---|---|---|---|---|---|---|
| 1 | USER a | 10 | 1~3 | 1~3 | - | - | 13/01/01 12:00:00 | 3 |
| 2 | USER b | 20 | 10~12 | - | 10~12 | 10~12 | 13/01/05 15:02:30 | - |
| 3 | USER c | 50 | 4, 8, 9 | 8, 9 | 4 | 4 | 13/01/02 09:50:03 | 1 |
| ... | ... | ... | ... | ... | ... | ... | ... | ... |

FIG. 4B

| MISSION ID | NAME | IMAGE DATA | ENEMY ID | ITEM ID |
|---|---|---|---|---|
| 1 | DUNGEON 1 | D1 | 1 | 1 |
| 2 | DUNGEON 2 | D2 | 2 | 2 |
| 3 | DUNGEON 3 | D3 | 3 | 3 |
| ... | ... | ... | ... | ... |

FIG. 4C

| ITEM ID | NAME | IMAGE DATA |
|---|---|---|
| 1 | ITEM A | I1 |
| 2 | ITEM B | I2 |
| 3 | ITEM C | I3 |
| 4 | ITEM D | I4 |
| ... | ... | ... |

METHOD FOR PROVIDING A GAME, RECORDING MEDIUM AND SERVER

CROSS-REFERENCE TO RELATED APPLICATION

The present application is a continuation application which claims the benefit of priority under 35 U.S.C. § 120 of U.S. patent application Ser. No. 16/890,256, filed Jun. 2, 2020, which is a continuation of U.S. patent application Ser. No. 16/133,274, filed Sep. 17, 2018 (U.S. patent Ser. No. 10/709,976), which is a continuation of U.S. patent application Ser. No. 15/684,241, filed Aug. 23, 2017 (now U.S. Pat. No. 10,086,281), which is a continuation of U.S. patent application Ser. No. 14/987,412, filed Jan. 4, 2016 (now U.S. Pat. No. 9,770,656), which is a continuation of U.S. patent application Ser. No. 14/109,704, filed Dec. 17, 2013 (now U.S. Pat. No. 9,272,222), which claims benefit of JP 2013-129889, filed on Jun. 20, 2013. The entire contents of which are hereby incorporated by reference.

TECHNICAL FIELD

The present invention relates to a method for providing a game, a recording medium, and a server.

BACKGROUND

In recent years, a server which provides a game to portable devices via a communication network has spread. The game provided by the server includes one in which a plurality of users can participate (a so-called "social game"), in which the users can not only battle and cooperate with each other but also communicate with each other.

As an example of such a social game, Patent Gazette No. JP5118261 describes a game in which a user battles with an enemy character by using a card (a so-called "card battle game"). In the card battle game, a user battles with an enemy character prepared on a game program by using a card while cooperating with another user. In such a game, a user can acquire an item by clearing a mission generated in the game, and can strengthen his/her card by using the item.

SUMMARY

Generally, a game includes a plurality of missions. The missions are the same for all users, and the number of missions to be presented is limited. Thus, the user is not able to try various missions. Moreover, items which can be acquired by clearing the missions are generally not clearly presented. Therefore, the user only tries all the missions to acquire the item he/she wants. Thus, a conventional game is not so interesting for the user, and the user may lose interest in continuing the game.

An object of the present invention is to increase chances for a user to select a mission, and to maintain and increase the user's interest in continuing a game.

Provided is a method for providing a game in which a plurality of missions is presented to a user device each time a certain period has elapsed from a server having a storage unit for storing user information relating to a plurality of users. The method includes the steps of generating a plurality of different missions for each of the plurality of users based on the user information stored in the storage unit, presenting a list of the generated missions for each of the users on the user device, and presenting an operational element for updating a mission included in the presented list to another mission, regardless of the elapse of the period in accordance with the progress of presented missions.

Preferably, the above method further includes the step of updating a mission included in the presented list to another mission generated for a corresponding user in response to operation of the operational element.

Preferably, in the above method, the storage unit stores information about another user associated with each of the plurality of users as the user information, and the step of presenting the list includes the step of presenting, along with the missions generated for a first user, a mission presented on a second user device of a second user associated with the first user, on the user device of the first user.

Preferably, the above method further includes the step of notifying the second user device that the mission presented on the second user device has also been presented on the user device of the first user.

Preferably, in the above method, the storage unit stores information about the time when each of a plurality of users has most recently played the game, as the user information, and the step of presenting the list includes the step of preferentially selecting, out of the plurality of other users associated with the first user, a device of a user who has not played the game for a longer time, as the second user device.

Preferably, in the above method, the step of presenting the list includes the step of presenting the mission presented on the second user device, on the user device of the first user only within a certain period.

Preferably, in the above method, the step of presenting the list includes the step of presenting the generated mission for each of the users and an item which can be acquired by the user by clearing the mission, on the user device in association with each other.

Provided is a non-transitory recording medium that has recorded a control program of a server, the server having a storage unit for storing user information relating to a plurality of users, for providing a game in which a plurality of missions is presented each time a certain period has elapsed to a user device. The control program causes the server to execute a process, the process including generating a plurality of different missions for each of the plurality of users based on the user information stored in the storage unit, presenting a list of the generated missions for each of the users on the user device, and presenting an operational element for updating a mission included in the presented list to another mission regardless of the elapse of the period in accordance with the progress of presented missions.

Provided is a server for providing a game in which a plurality of missions is presented each time a certain period has elapsed to a plurality of user devices. The server includes a storage unit for storing user information relating to a plurality of users, a generation unit for generating a plurality of different missions for each of the plurality of users based on the user information stored in the storage unit, and a listing unit for presenting a list of the missions for each of the users generated by the generation unit on the user devices. The listing unit presents an operational element for updating a mission included in the presented list to another mission, regardless of the elapse of the period in accordance with the progress of presented missions.

According to the above method for providing a game, the recording medium and the server, it is possible to increase the chances of a user selecting a mission, and maintaining and increasing the user's interest in continuing a game.

BRIEF DESCRIPTION OF THE DRAWINGS

Other features and advantages of the present optical device will be apparent from the ensuing description, taken in conjunction with the accompanying drawings, in which:

FIGS. 4A to 4C illustrate examples of data structures of the various types of tables.

DESCRIPTION

Hereinafter, with reference to the drawings, a method for providing a game, a recording medium, and a server will be described. It should be noted that the technical scope of the present invention is not limited to embodiments of the invention, but covers the invention described in the claims and its equivalent.

A game system described below provides a social game in which a plurality of users (players) can participate and a plurality of new missions is presented each time a certain period has elapsed. When the period is 24 hours, for example, a new mission is automatically presented to the users every day in the game system described below. "Mission" means a constituent element of a game called "quest", "dungeon" or the like which allows the users to acquire an item and the like by clearing a mission. The mission is, for example, to explore a dungeon, battle with an enemy character, and acquire an item in the dungeon. The user plays the game while clearing a plurality of missions to collect desired items with his/her own portable device.

The game may be, for example, a mini game provided in a card battle game for battling with an enemy character by using a card. In this case, the item can be used to strengthen a card for a card battle, for example. The user can advantageously play the card battle by strengthening his/her own card by using the items collected in the plurality of missions.

Each of the portable devices requires a mission list for each of the users to select a mission of a server in response to an operation performed by the user. Consequently, the server presents a mission list generated for each of the users in which different missions are listed, to a corresponding portable device of the user. The server updates the missions included in the mission list to other missions in response to a request from the portable device. Thus, a user who has cleared the missions quickly can select a new mission without waiting, for example, 24 hours. Therefore, the chances of the user selecting the missions increase, making it possible to maintain and increase the user's interest in continuing the game.

Figure 1:
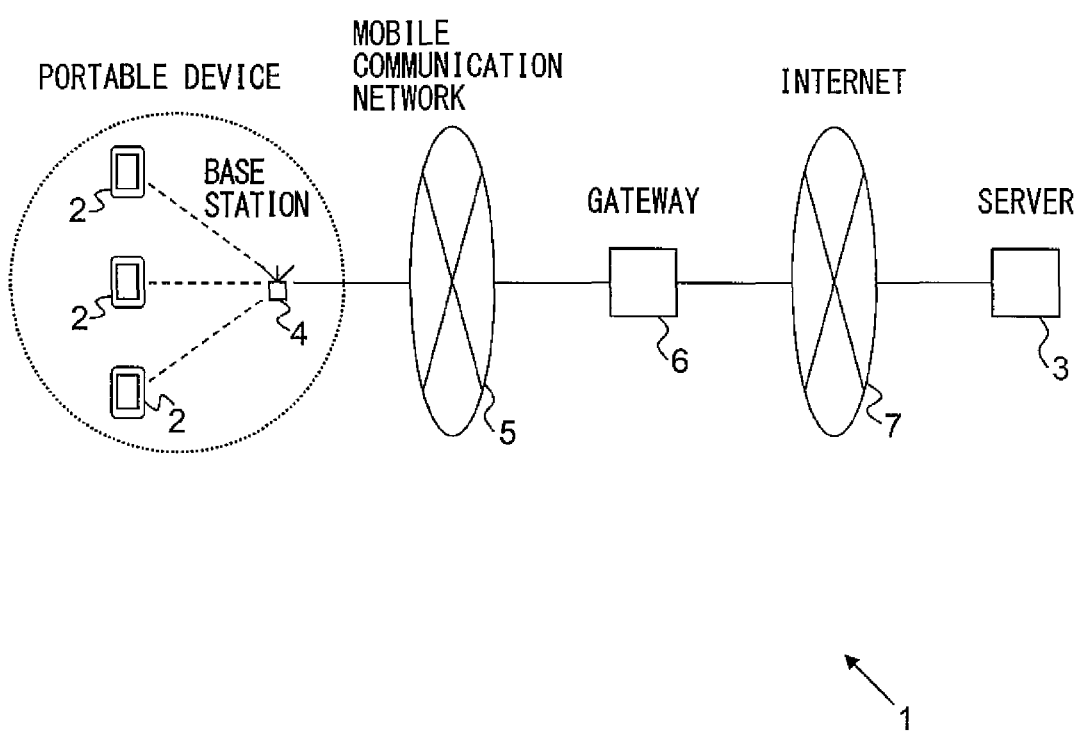
FIG. 1 illustrates an example of a schematic configuration of a game system.

FIG. 1 illustrates an example of a schematic configuration of a game system 1.

The game system 1 includes at least one portable device 2 and a server 3. The portable device 2 and the server 3 are connected to each other via a communication network, and are connected to each other, for example, via a base station 4, a mobile communication network 5, a gateway 6, and the Internet 7. A program to be executed by the portable device 2 (e.g., a browsing program) and a program to be executed by the server 3 (e.g., a game program) communicate with each other by using a communication protocol such as a Hypertext Transfer Protocol (HTTP).

Figure 2:
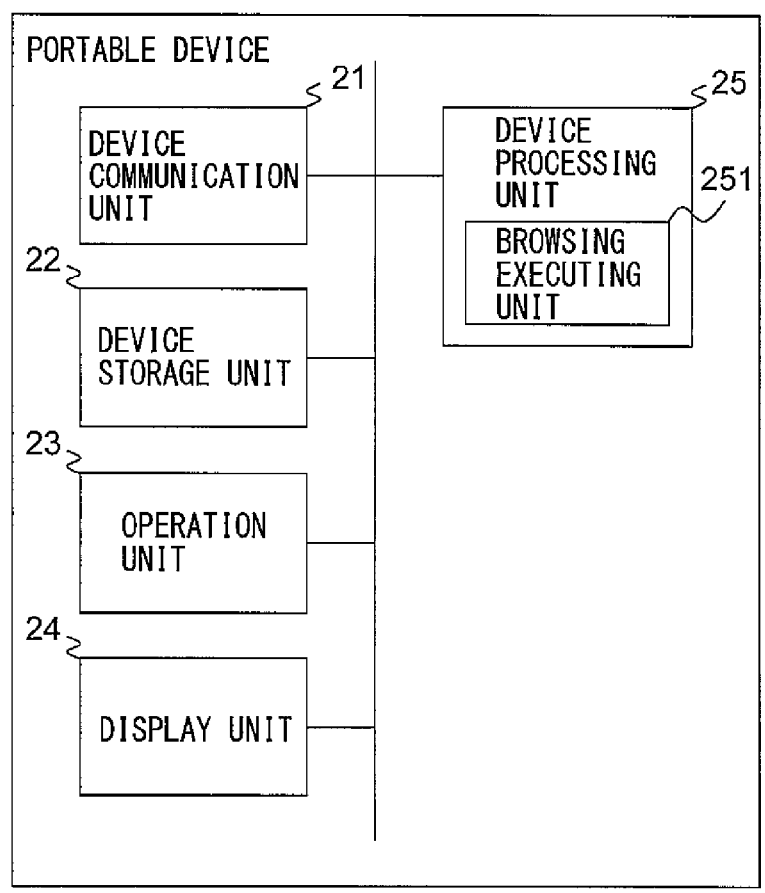
FIG. 2 illustrates an example of a schematic configuration of the portable device.

FIG. 2 illustrates an example of a schematic configuration of the portable device 2.

The portable device 2 is connected to the server 3 via the base station 4, the mobile communication network 5, the gateway 6, and the Internet 7, to communicate with the server 3. The portable device 2 requests the progress of a game of the server 3 in response to an operation of an operation unit 23 (e.g., a button) by a user. The portable device 2 receives display data relating to the progress of the game from the server 3, and displays the received display data. In order to implement the foregoing functions, the portable device 2 includes a device communication unit 21, a device storage unit 22, the operation unit 23, a display unit 24, and a device processing unit 25.

While a multifunctional mobile phone (a so-called "smartphone") may be assumed as being the portable device 2, the present invention is not limited to this. The portable device 2 may be, for example, a mobile phone (a so-called "feature phone"), a personal digital assistant (PDA), a portable game machine, a portable music player, a tablet personal computer (PC) and the like, as long as the present invention is applicable thereto.

The device communication unit 21 includes a communication interface circuit including an antenna having a sensitivity band in a certain frequency band, and connects the portable device 2 to a wireless communication network. The device communication unit 21 establishes a wireless signal link with the base station 4 by a Wideband Code Division Multiple Access (WCDMA) (registered trademark) system or the like via a channel to be assigned by the base station 4, and communicates with the base station 4. The device communication unit 21 transmits data supplied from the device processing unit 25 to the server 3 or the like. The device communication unit 21 supplies the data received from the server 3 or the like to the device processing unit 25.

The device storage unit 22 includes a semiconductor memory device, for example. The device storage unit 22 stores an operating system program, a driver program, an application program, data, and the like used for processing in the device processing unit 25. For example, the device storage unit 22 stores, for example, an input device driver program for controlling the operation unit 23 and an output device driver program for controlling the display unit 24, as the driver program. The device storage unit 22 stores a program and the like for retrieving and displaying display data relating to the progress of the game, as the application program. The device storage unit 22 stores display data, video data, image data and the like relating to the progress of the data, as the data. Further, the device storage unit 22 may store temporary data relating to certain processing.

The operation unit 23 may be any device capable of operating the portable device 2, for example, a touch pad, a keyboard or the like. The user can input letters, numbers, and the like using the operation unit 23. When operated by the user, the operation unit 23 generates a signal corresponding to the operation. The generated signal is supplied to the device processing unit 25 as an instruction from the user.

The display unit 24 may be any device capable of displaying a video, an image and the like, for example, a liquid crystal display and an organic electro-luminescence (EL) display. The display unit 24 displays a video, an image and the like corresponding to video data and image data supplied from the device processing unit 25.

The device processing unit 25 includes one or a plurality of processors and their peripheral circuits. The device processing unit 25 is, for example, a central processing unit (CPU), and integrally controls an overall operation of the portable device 2. The device processing unit 25 controls operations of the device communication unit 21, the display unit 24, and the like so that various types of processing of the portable device 2 are performed in an appropriate order in accordance with the programs stored in the device storage unit 22, the operation of the operation unit 23, and the like. The device processing unit 25 performs processing based on the programs (the operating system program, the driver program, the application program and the like) stored in the device storage unit 22. The device processing unit 25 can execute a plurality of programs (application programs and the like) in parallel.

The device processing unit 25 includes at least a browsing executing unit 251. Each of the units is a functional module implemented by a program to be executed by the processor included in the device processing unit 25. Alternatively, each of the units may be provided as a firmware on the portable device 2.

The browsing executing unit 251 retrieves and displays the display data relating to the progress of the game. In other words, a request to retrieve the display data relating to the progress of the game is transmitted to the server 3 via the device communication unit 21 in response to an instruction from the user. The browsing executing unit 251 receives corresponding display data from the server 3 via the device communication unit 21. The browsing executing unit 251 generates drawing data based on the received display data. In other words, the browsing executing unit 251 interprets the received display data to specify control data and content data, lays out the specified content data according to the specified control data, and generates the drawing data. Then, the browsing executing unit 251 outputs the generated drawing data to the display unit 24.

Figure 3:
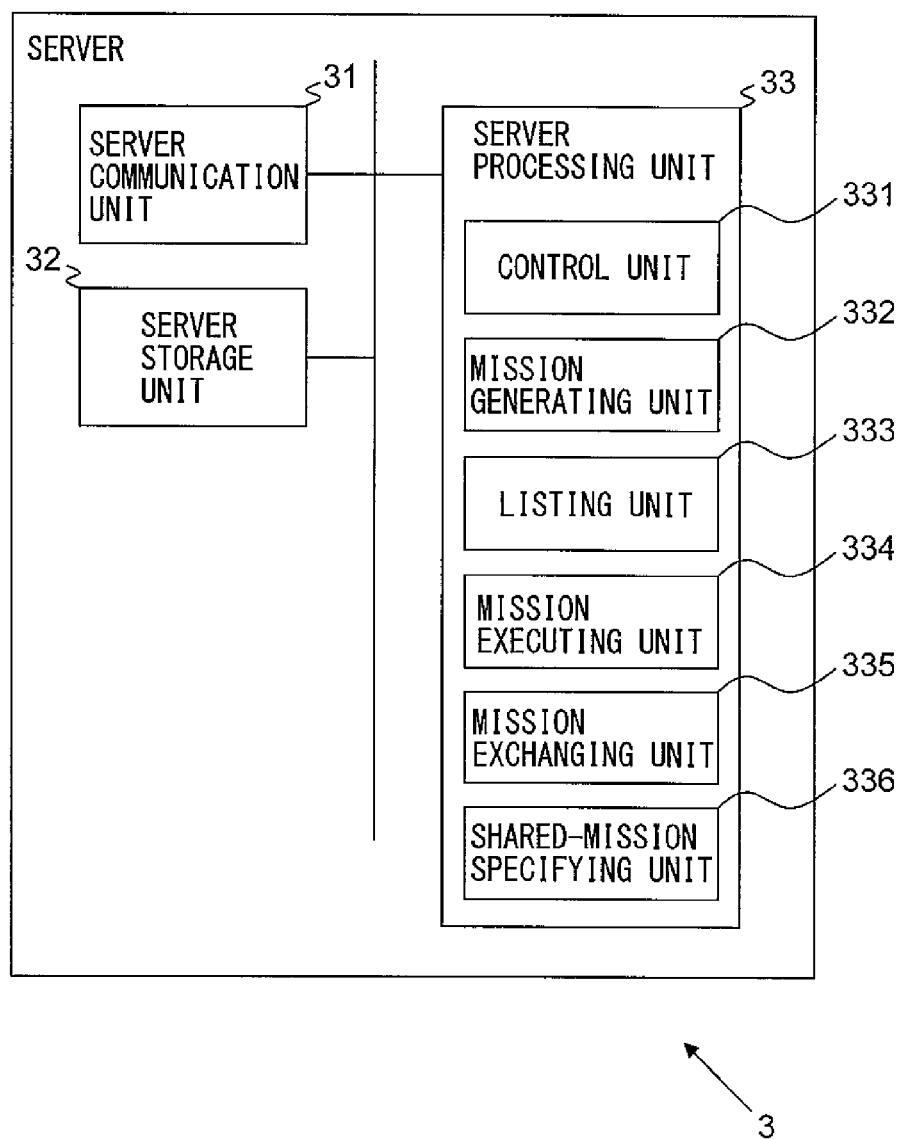
FIG. 3 illustrates an example of a schematic configuration of the server.

FIG. 3 illustrates an example of a schematic configuration of the server 3.

The server 3 proceeds the game in response to a request from the portable device 2. The server 3 generates the display data relating to the progress of the game, and transmits the generated display data to the portable device 2. In order to implement the foregoing function, the server 3 includes a server communication unit 31, a server storage unit 32, and a server processing unit 33.

The server communication unit 31 includes a communication interface circuit for connecting the server 3 to the Internet 7, and communicates with the Internet 7. The server communication unit 31 supplies the data received from the portable device 2 or the like to the server processing unit 33. The server communication unit 31 transmits the data supplied from the server processing unit 33 to the portable device 2 or the like.

The server storage unit 32 includes at least one of a magnetic tape device, a magnetic disk device and an optical disk device, for example. The server storage unit 32 stores an operating system program, a driver program, an application program, data, and the like used for processing in the server processing unit 33. The server storage unit 32 stores for example, a game program and the like for advancing the game and generating display data relating to its result, as the application program. The server storage unit 32 stores, as the data, a user table (FIG. 4A) for managing users, a mission table (FIG. 4B) for managing missions, and an item table (FIG. 4C) for managing items and the like. Further, the server storage unit 32 may store temporary data relating to certain processing.

FIGS. 4A to 4C illustrate examples of data structures of the various types of tables.

FIG. 4A illustrates an example of the data structure of the user table. The user table includes for each user, a user identifier (ID), a name, a level, a presented mission ID, an uncleared mission ID, a cleared mission ID, an acquired item ID, a previous finishing date and time, a friend ID and the like. The presented mission ID is an ID of each of the missions to be presented on a mission list for the target user. The uncleared mission ID is an ID of a mission which has not yet been cleared out of the missions presented on the mission list. The cleared mission ID is an ID of a mission that has already been cleared by the target user. The previous finishing date and time is information representing the date and time of the last time the target user ended the game.

The friend ID is an ID of another user in a friend status with the target user. In the game provided by the game system 1, a friend status can be formed among the users. "Friend status" means a relationship constituted among users capable of jointly battling with an enemy character and sharing a mission in the game, as described below. A user can have a friend status with a plurality of users. However, an upper limit may be placed on the number of the other users whom a user can have a friend status with. A user c in a friend status with a user a is an example of other users associated with the user a.

FIG. 4B illustrates an example of the data structure of the mission table. The mission table includes for each mission an ID of the mission, a name, a file name of image data, an ID of an enemy character to appear, an ID of an acquirable item and the like.

FIG. 4C illustrates an example of the data structure of the item table. The item table includes for each item an ID of the item, a name, a file name of image data and the like.

The server processing unit 33 includes one or a plurality of processors and their peripheral circuits. The server processing unit 33 is for example, a CPU, and integrally controls an overall operation of the server 3. The server processing unit 33 controls an operation of the server communication unit 31 or the like so that various types of processing of the server 3 are performed in an appropriate order in accordance with the programs stored in the server storage unit 32. The server processing unit 33 executes processing based on the programs stored in the server storage unit 32 (the operating system program, the driver program, the application program and the like). The server processing unit 33 can execute the plurality of programs (the application program and the like) in parallel.

FIGS. 5A to 5F illustrate examples of a display screen of the portable device 2 based on the display data generated by the server 3.

Figure 5A:
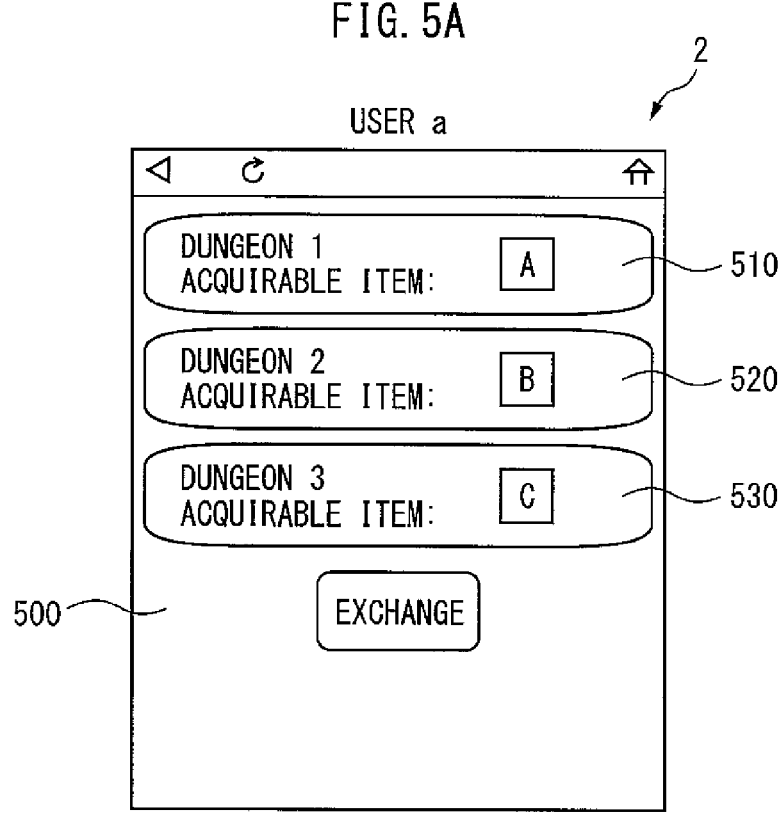
FIGS. 5A to 5F illustrate examples of a display screen of the portable device.
Figure 5B:
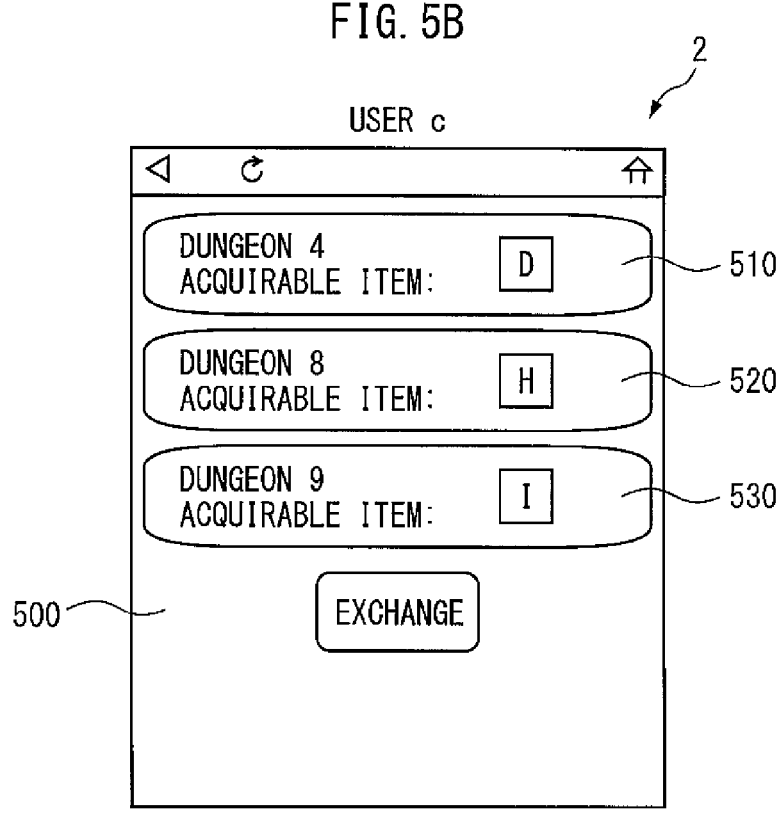

FIGS. 5A and 5B respectively illustrate mission lists 500 in an initial state of the user a and the user c. Each mission list 500 is displayed based on list display data received from the server 3. On a screen of the user a, dungeons 1 to 3 and items A to C, which can be acquired by clearing the dungeons, are presented as a plurality of missions for the user a. On a screen of the user c, dungeons 4, 8, and 9 and items D, H, and I, which can be acquired by clearing the dungeons, are presented as a plurality of missions for the user c. In such a manner, different missions are presented on the screens of different users. The number of missions to be presented may be any number, and in the following description, the number is set to three.

Each dungeon can be selected by pressing corresponding buttons 510, 520, or 530 displayed on the screen. Each of the users confirms the items clearly presented on the mission list 500, and operates the portable device 2 to select the mission in which the item desired by himself/herself can be acquired. When any one of the buttons 510, 520, and 530 is pressed, the portable device 2 requests the server 3 to execute the corresponding mission via the device communication unit 21. The item acquirable in each of the missions may include a plurality of types of items. In this case, the plurality of types of items may be presented on the mission list 500.

Figure 5C:
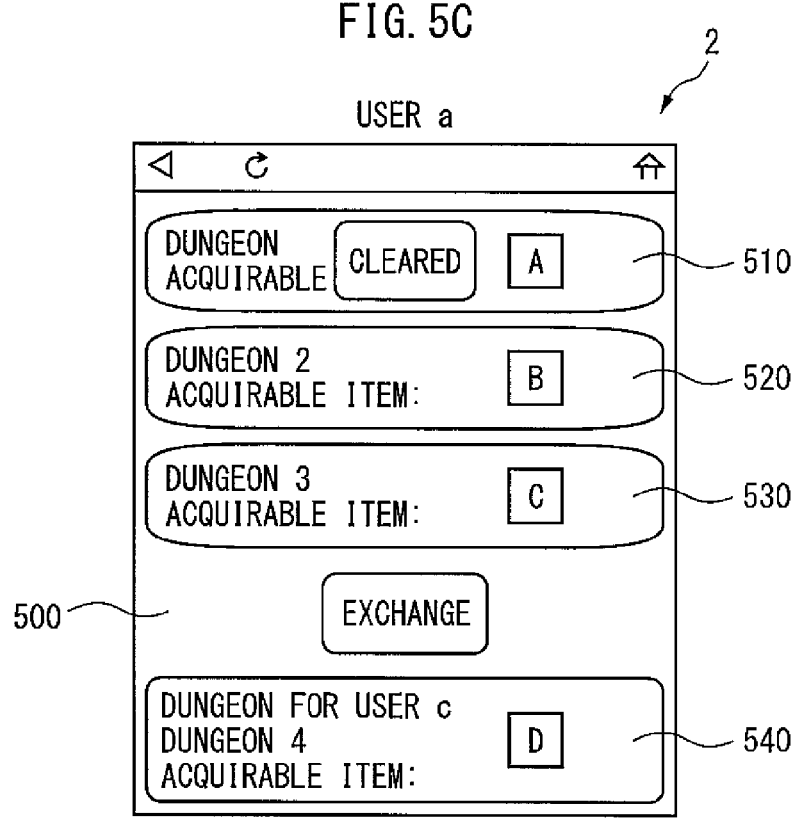
Figure 5D:
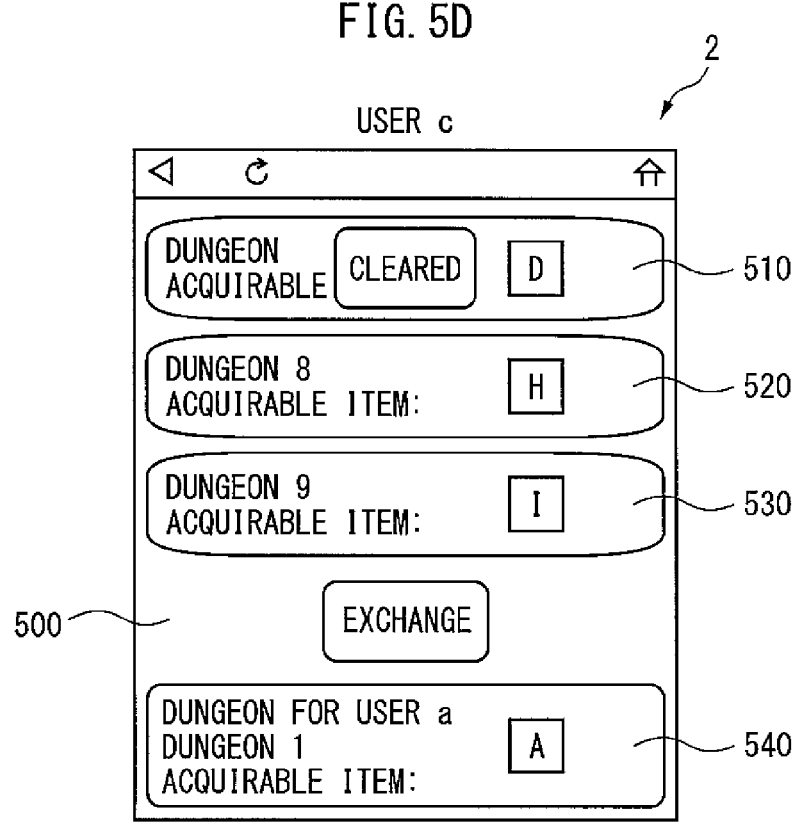

FIGS. 5C and 5D respectively illustrate mission lists 500 when the users a and c have selected the dungeons 1 and 4 in the presented missions and have cleared the dungeons 1 and 4. On the mission list 500, "cleared" is displayed on the button 510 corresponding to the dungeon 1 or 4, indicating that the dungeon 1 or 4 has been cleared. It is not desirable in the progress of a game that an unrestricted number of identical items can be acquired. Therefore, when one mission is cleared, in principle, the server 3 disables a corresponding button (the button 510) so that the mission may not be executed again. Accordingly, the users a and c are not able to select the dungeons 1 and 4 again, respectively.

On the mission list 500 for the user a illustrated in FIG. 5C, the mission (dungeon 4) which has been cleared by the other user c in a friend status with the user a, is also presented. Similarly, on the mission list 500 for the user c illustrated in FIG. 5D, the mission (dungeon 1) which has been cleared by the other user a in a friend status with the user c, is also presented. For example, the user a can also select the mission which has been presented on the mission list 500 for the other user c in a friend status with the user a and has been cleared by the user c, by pressing a button 540 displayed on a lower part of the mission list 500. A mission for a second user which has been presented together on a mission list for a first user, will be hereinafter referred to as a "shared mission". When the button 540 is pressed, the portable device 2 also requests the server 3 to execute a corresponding mission via the device communication unit 21.

Figure 5E:
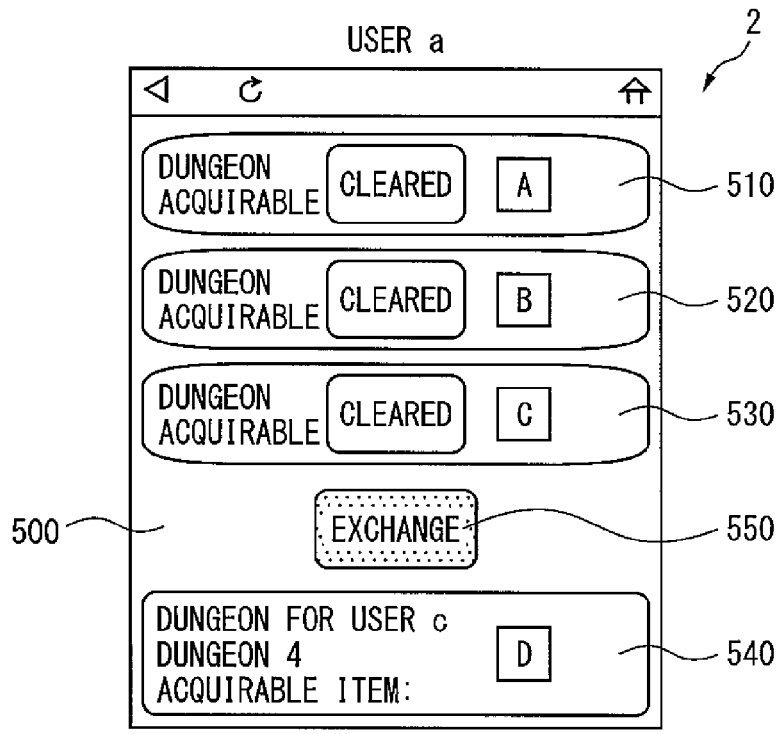

FIG. 5E illustrates the mission list 500 when the user a has cleared all the missions corresponding to the presented dungeons 1 to 3. When a certain number of (three) missions presented for each user are all cleared, the server 3 enables an exchange button 550 for exchanging the presented missions. Thus, the user can operate the exchange button 550. When the exchange button 550 is pressed, the portable device 2 requests the server 3 to exchange the missions via the device communication unit 21. On the mission list 500, the user a can operate the button 540, because he/she has not yet cleared the dungeon 4 serving as the shared mission.

Figure 5F:
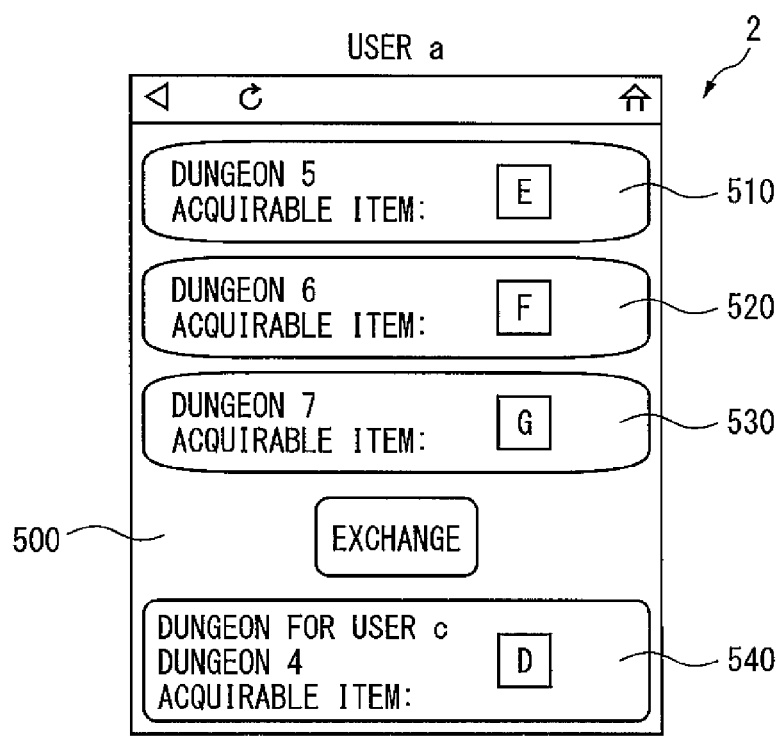

FIG. 5F illustrates the mission list 500 when the exchange button 550 is pressed, and dungeons 5 to 7 are presented as new missions for the user a. On the mission list 500, the buttons 510, 520, and 530 are re-enabled, and are updated to ones corresponding to the dungeons 5 to 7, respectively. On the other hand, when the missions have been exchanged, the exchange button 550 is disabled. Thus, the user a can select any one of the dungeons 4 to 7 by pressing the buttons 510 to 540, just as on the mission list 500 illustrated in FIG. 5A or 5C.

To implement the foregoing functions, the server processing unit 33 includes a control unit 331, a mission generating unit 332, a listing unit 333, a mission executing unit 334, a mission exchanging unit 335, and a shared-mission specifying unit 336. Each of the units is a functional module implemented by a program to be executed by the processor included in the server processing unit 33. Alternatively, each of the units may be provided as firmware on the server 3.

The control unit 331 controls the progress of a game, and instructs the mission generating unit 332, the listing unit 333, the mission executing unit 334, the mission exchanging unit 335, and the shared-mission specifying unit 336 to perform processing, as needed.

The control unit 331 interprets, when it has received a user authentication request from the portable device 2 via the server communication unit 31, the received user authentication request, and specifies a user ID and a password. The control unit 331 instructs a user authenticating unit (not illustrated) to perform processing using the specified user ID and password as parameters. When the user authenticating unit has authenticated a user, the control unit 331 instructs the listing unit 333 to perform processing using the specified user ID as a parameter. The control unit 331 transmits list display data which has been returned by the listing unit 333, to the portable device 2 via the server communication unit 31.

The control unit 331 instructs, when it has received a mission execution request from the portable device 2 via the server communication unit 31, the mission executing unit 334 to perform processing using the received mission execution request as a parameter. When the mission executing unit 334 communicates with the portable device 2 a plurality of numbers of times to end execution of a mission, the control unit 331 deletes the ID of the mission from the "uncleared mission ID" for the target user in the user table, and adds the deleted ID to the "cleared mission ID" for the target user in the user table. Moreover, the control unit 331 calls the listing unit 333 again at this time, and instructs the listing unit 333 to perform processing. The control unit 331 transmits the list display data which has been returned by the listing unit 333, to the portable device 2.

The control unit 331 instructs, when it has received a mission exchange request from the portable device 2 via the server communication unit 31, the mission exchanging unit 335 to perform processing using the received mission exchange request as a parameter. When the mission exchanging unit 335 terminates mission exchange processing, the control unit 331 instructs the listing unit 333 to perform processing again. The control unit 331 transmits the list display data, which has been returned by the listing unit 333, to the portable device 2.

The mission generating unit 332 generates a plurality of different missions for each user in response to a request issued by the mission exchanging unit 335. The mission generating unit 332 selects, for each of a geography of a dungeon to be explored by the user, an enemy character that appears in the dungeon, and an item acquirable in the dungeon, one of a plurality of candidates to constitute the mission. Thus, the mission generating unit 332 generates a plurality of missions, which differ in a combination of a geography of a dungeon, an appearing enemy character, and an acquirable item, for example.

If, for example, the game system 1 provides a game including ten missions in all to each of the users, the ten missions differ depending on the user. Thus, in a general game, a plurality of identical missions is provided to all of the users, but in the game provided by the game system 1, different missions are provided to each user. The mission generating unit 332 may generate, for example, individual missions at random or generate different missions for each of the users according to any regularity.

The mission generating unit 332 refers to the user table using the user ID as a key, specifies the level of the target user, and then generates missions. The higher the level is, the higher the degree of difficulty of the generated mission is.

The mission having a high degree of difficulty is, for example, a mission in which a stronger enemy character appears and in which the user consumes more physical strength to clear. The mission generating unit 332 sets items acquirable in each of the missions. The higher the degree of difficulty of the mission is, the more valuable the items to be acquired in the mission are and the larger the number of the items to be acquired in the mission becomes. The mission generating unit 332 adds information about the generated mission to the mission table.

The listing unit 333 presents a list of the missions which have been generated by the mission generating unit 332, to the portable device 2 of each of the users via the server communication unit 31. In order to achieve such function, the listing unit 333 generates list display data for displaying the mission list 500 illustrated in FIGS. 5A to 5F on the portable device 2. Specifically, the listing unit 333 refers to the user table using the user ID as a key, and specifies the IDs of (e.g., three) missions generated for the target user and to be presented on the mission list 500 and whether the missions have been cleared. The listing unit 333 causes the shared-mission specifying unit 336 to specify a shared mission to be presented on the mission list 500. Further, the listing unit 333 refers to the mission table using each of the specified mission IDs as a key, and specifies the item acquirable in each mission.

The listing unit 333 generates list display data so that names of respective missions, an image, items acquirable by clearing the missions, data for indicating whether each of the missions has been cleared, and buttons for selecting respective missions are displayed. The listing unit 333 enables, for an uncleared mission, a button of the mission, and disables, for a cleared mission, a button of the mission. Particularly for a shared mission, a button is displayed so that the user can select the mission only within a certain effective time to prevent the number of missions to be presented from increasing unlimitedly.

Further, the listing unit 333 presents an operational element for updating the missions included in the mission list 500 to other missions according to the progress of the presented missions. Specifically, the listing unit 333 enables, when the three missions currently presented are all cleared missions, the exchange button 550 illustrated in FIG. 5E for exchanging the missions. The listing unit 333 may disable the exchange button 550 when at least one of the missions currently presented has been cleared. The exchange button 550 is an example of the operational element.

The mission executing unit 334 communicates with the portable device 2 a plurality of times to execute the mission when receiving the mission execution request from the portable device 2 caused by the user operating a button corresponding to one mission on the mission list 500. The mission may be executed by the device processing unit 25 in the portable device 2 without providing the mission executing unit 334 in the server 3.

The mission exchanging unit 335 exchanges, when receiving a mission exchange request from the portable device 2 caused by the user operating the exchange button 550 in the mission list 500, a mission in the mission list 500 for another mission generated by the mission generating unit 332 for the target user.

Specifically, the mission exchanging unit 335 causes, when the user operates the exchange button 550 in the mission list, the mission generating unit 332 to generate a new mission for the user. The mission exchanging unit 335 deletes the ID of the mission from the "presented mission ID" for the target user in the user table, and adds the ID of the newly generated mission to the "uncleared mission ID" and the "presented mission ID" for the target user. When the mission exchanging unit 335 exchanges the missions, the possibility that the user can select a mission he/she likes becomes higher, increasing the user's will to continue the game.

As described above, in the game system 1, a plurality of new missions are presented each time a certain period (e.g., 24 hours) has elapsed. However, the mission exchanging unit 335 exchanges the missions presented on the mission list 500 regardless of whether the certain period has elapsed, in response to the user operating the exchange button 550. In other words, since the exchange button 550 is disabled each time the three presented missions are cleared, the user who has cleared the missions quickly can select a new mission without waiting, for example, 24 hours.

The mission exchanging unit 335 may perform exchange processing not only for the missions generated for each of the users but also for a shared mission. The missions to be exchanged by the mission exchanging unit 335 may include a mission cleared once by the user. In other words, the same mission may be presented again by exchanging the missions. In this case, the user can re-execute the mission that has been cleared once.

The shared-mission specifying unit 336 specifies a mission presented to a portable device of a second user in a friend status with a first user so that the shared mission is presented on a portable device of the first user. A first user (himself/herself) and one of second users (other users) are described below as the user a and the user c, respectively.

The shared-mission specifying unit 336 first refers to the user table using the user ID of the user a as a key, and specifies other users in a friend status with the user a. The shared-mission specifying unit 336 may present shared missions for all the users in a friend status with the user a on the mission list 500 for the user a. When the number of users is large, however, the shared missions are presented only for the number of users within a certain upper limit. The shared-mission specifying unit 336 sets the upper limit of the number of users for which the shared missions are presented to four, for example, and makes respective missions cleared by the four users as the shared missions. As the four users, the shared-mission specifying unit 336 selects, out of the users in a friend status with the user a, the two users whose previous finishing date and time are most and second most recent and two users whose previous finishing date and time are the oldest and the second oldest. In other words, the shared-mission specifying unit 336 selects the user who has most recently played the game and the user who has not recently played the game as the other users for which the shared mission is to be presented on the mission list 500 for the user a.

The shared-mission specifying unit 336 refers to the user table using the user ID of the selected other user as a key, selects one of cleared missions for the user, and specifies the selected cleared mission as a shared mission. A shared mission is selectable by the user only within a certain effective time. Thus, for each of the users, the shared-mission specifying unit 336 specifies one mission which has most recently been cleared by the user, for example, as a shared mission. Alternatively, the shared-mission specifying unit 336 may select one of the uncleared missions for the user and specify the selected uncleared mission as a shared mission.

Presenting a shared mission on the mission list 500 may enable a user to acquire a desired item in the shared mission although the desired item is not able to acquire in his/her own mission, for example. A user in a friend status with more users can more easily acquire items because the number of missions to be shared increases. When the shared missions are presented on the mission list 500, therefore, a chance for the user to select the missions further increases, which increases the user's will to continue the game.

A dungeon in which an item desired by a user can be acquired may preferentially be displayed. For example, to enable the user to reliably acquire the item he/she desires, a mission which the user was unable to clear in the past, is managed in the server 3, and the shared-mission specifying unit 336 may preferentially extract, out of a plurality of candidates of shared missions, the mission that the user was unable to clear in the past.

A mission and an item which can be acquired when the mission has been cleared are managed in association with each other in the server 3 (the mission table illustrated in FIG. 4B). When a user designates a desired item in advance, the shared-mission specifying unit 336 may be controlled to preferentially extract, out of a plurality of candidates of shared missions, a mission in which the item designated by the user can be acquired.

Since the mission generating unit 332 generates missions corresponding to the level of a user, a shared mission is a mission corresponding to the level of another user in a friend status with the user a. If another user has a higher level than that of the user a, for example, a mission which is not presented at the level of the user a may be presented as a shared mission. In this case, it is difficult for the user a to clear the shared mission, but if the user a clears the shared mission, the user a can acquire more items than when the user a clears a mission generated for himself/herself.

In order to present missions with a higher level of difficulty, the shared-mission specifying unit 336 may set a mission which has been cleared by the user having a higher level than that of the user a out of the plurality of users in a friend status with the user a, as a shared mission. Alternatively, the shared-mission specifying unit 336 may set, as a shared mission, a mission for another user in a certain relationship other than the friend status such as a user designated by the user a.

Further, the number of shared missions to be presented is not limited to one but may be plural per user in a friend status with the user a. For example, a parameter such as a degree of intimacy may be set between a user and another user in a friend status therewith, and the number of shared missions to be presented and the type and the number of items acquirable in the shared missions may be made different depending on the parameter.

The shared-mission specifying unit 336 push-notifies the portable device of the second user via the server communication unit 31 that a mission presented on the portable device of the second user (user c) in a friend status with the first user (user a) has also been presented on the portable device of the first user. In this case, the shared-mission specifying unit 336 clearly presents the user name of the first user (user a) and push-notifies the second user of the user name. Thus, a user becomes more interested and motivated to the game when "Mission has been shared by user a", for example, is notified to clearly present a one-to-one relationship between users than when "New mission has started" is simply notified simultaneously from the server 3 to users. Particularly, the shared-mission specifying unit 336 selects a user who has not recently played the game as the second user, to encourage the user to participate in the game.

Figure 6:
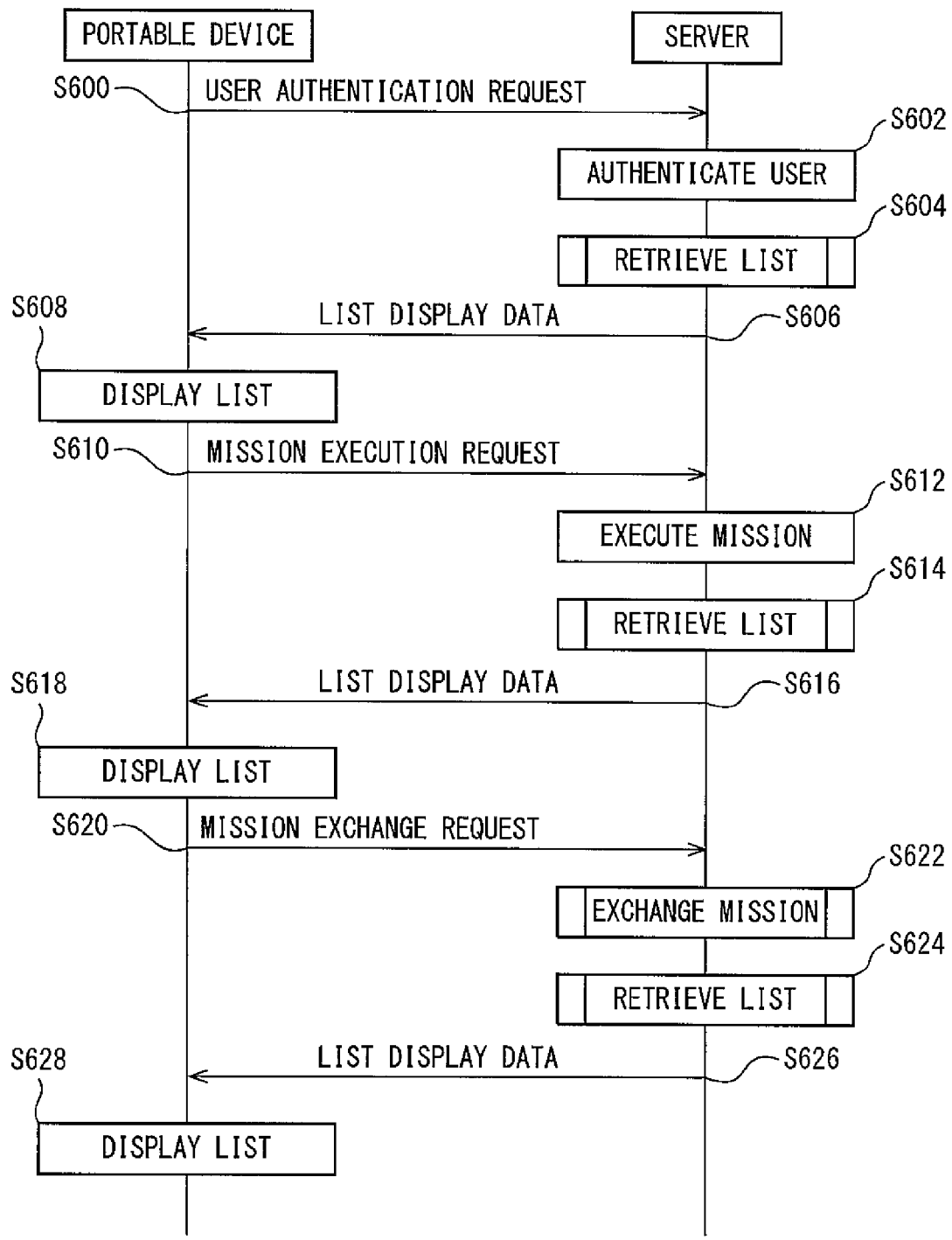
FIG. 6 illustrates an example of an operation sequence of the game system.

FIG. 6 illustrates an example of an operation sequence of the game system 1. The operation sequence described below is executed mainly by the device processing unit 25 and the server processing unit 33 based on programs previously stored in the device storage unit 22 and the server storage unit 32, in cooperation with each of the units in the portable device 2 and the server 3.

The user a instructs the device processing unit 25 to execute a program for retrieving and displaying display data relating to the progress of the game via the operation unit 23. The device processing unit 25 starts processing based on this program. In other words, the browsing executing unit 251 to be implemented by the program transmits, when the user a has input a user ID and a password via the operation unit 23, a user authentication request including the input user ID, password and the like to the server 3 via the device communication unit 21 (step S600).

The control unit 331 interprets, when receiving the user authentication request via the server communication unit 31 from the portable device 2, the received user authentication request and specifies the user ID and the password. The control unit 331 instructs a user authenticating unit (not illustrated) to perform processing using the specified user ID and password as parameters (step S602). The control unit 331 instructs, when the user authenticating unit has authenticated the user, the listing unit 333 to perform processing using the specified user ID as a parameter (step S604).

The control unit 331 transmits list display data which has been returned by the listing unit 333 to the portable device 2 via the server communication unit 31 (step S606). The browsing executing unit 251 in the portable device 2 generates, when receiving the list display data from the server 3 via the device communication unit 21, drawing data based on the received list display data. The browsing executing unit 251 outputs the generated drawing data to the display unit 24 to display a mission list thereon (step S608).

When an execution instruction of a mission has been input on the mission list by the user via the operation unit 23, the browsing executing unit 251 transmits a content of the instruction and the user ID to the server 3 via the device communication unit 21 (step S610). The control unit 331 of the server 3 instructs, when receiving the mission execution request from the portable device 2 via the server communication unit 31, the mission executing unit 334 to perform processing using the received mission execution request as a parameter (step S612).

When the mission executing unit 334 terminates the mission execution processing, the control unit 331 instructs the listing unit 333 to perform processing (step S614), just as in step S604, and transmits list display data which has been returned by the listing unit 333 to the portable device 2 (step S616), just as in step S606. The browsing executing unit 251 of the portable device 2 causes the display unit 24 to display a mission list on the display unit 24 (step S618), just as in step S608.

When an exchange instruction of the missions has been input on the mission list by the user via the operation unit 23, the browsing executing unit 251 transmits a content of the instruction and the user ID to the server 3 via the device communication unit 21 (step S620). The control unit 331 of the server 3 instructs, when receiving a mission exchange request from the portable device 2 via the server communication unit 31, the mission exchanging unit 335 to perform processing using the received mission exchange request as a parameter (step S622).

The control unit 331 instructs, when the mission exchanging unit 335 terminates the mission exchange processing, the listing unit 333 to perform processing (step S624), just as in step S604. The control unit 331 transmits list display data which has been returned by the listing unit 333 to the portable device 2 (step S626), just as in step S606. The browsing executing unit 251 of the portable device 2 causes the display unit 24 to display a mission list (step S628). Subsequently, processing is similarly performed.

Figure 7A:
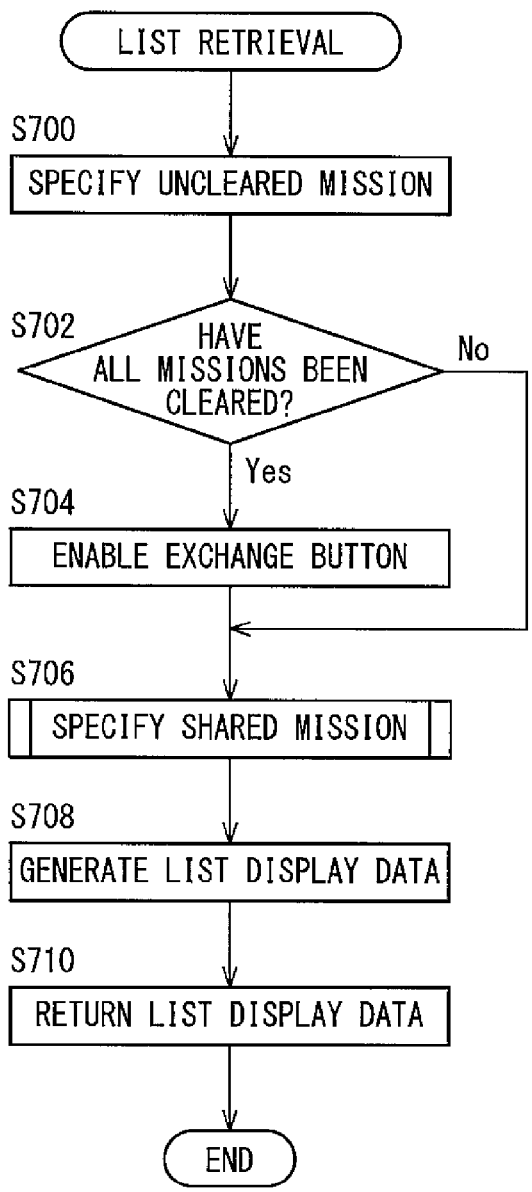
FIGS. 7A and 7B illustrate an example of an operation flow of the server.

FIG. 7A illustrates an example of an operation flow of the listing unit 333.

The listing unit 333 first specifies an uncleared mission for a target user (step S700). In this case, the listing unit 333 refers to the user table using the user ID of the target user as a key, and specifies the three presented mission IDs and the uncleared mission IDs. Further, the listing unit 333 refers to the mission table using each of the specified presented missions IDs as a key, and also specifies the item acquirable in the corresponding mission.

If all the three missions which have been specified in step 700 have been cleared (i.e., there is no uncleared mission ID) (YES in step S702), the listing unit 333 disables the exchange button 550 (step S704). On the other hand, if the three missions which have been specified in step S700 includes an uncleared mission (NO in step S702), the listing unit 333 keeps the exchange button 550 disabled without executing step S704.

The listing unit 333 then causes the shared-mission specifying unit 336 to specify a shared mission to be presented on the mission list (step S706). The listing unit 333 generates list display data for displaying a mission list including names of respective missions, images, acquirable items, data for indicating whether each of the missions has been cleared, and buttons for selecting respective missions (step S708). The listing unit 333 returns the list display data to the control unit 331 (step S710), and then terminates the processing.

In the operation flow illustrated in FIG. 7A, the shared mission is specified in step S706 each time list retrieval processing is performed. However, since the shared-mission specifying unit 336 specifies the mission which has most recently been cleared by each user as the shared mission, for example, even if step S706 is executed, the shared mission presented on the mission list may not be changed.

Figure 7B:
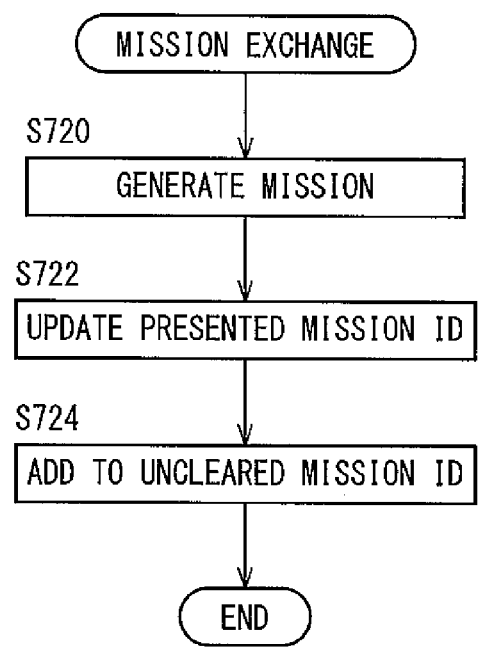

FIG. 7B illustrates an example of an operation flow of the mission exchanging unit 335.

The mission exchanging unit 335 first causes the mission generating unit 332 to newly generate missions for the target user (step S720). The mission exchanging unit 335 updates the presented mission IDs for the target user in the user table with IDs of the missions newly generated (step S722). Further, the mission exchanging unit 335 adds the IDs of the missions newly generated to the uncleared mission IDs for the target user in the user table (step S724). Then, the mission exchanging unit 335 terminates the processing.

Figure 8:
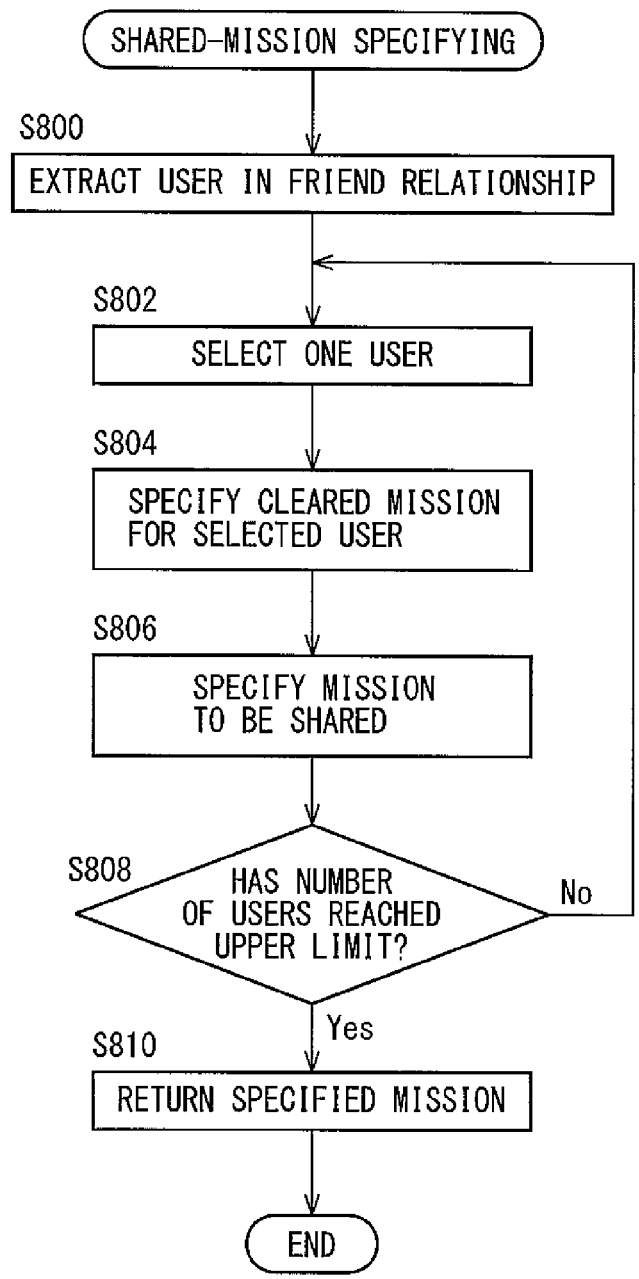
FIG. 8 illustrates an example of an operation flow of the server.

FIG. 8 illustrates an example of an operation flow of the shared-mission specifying unit 336.

The shared-mission specifying unit 336 first refers to the user table using the user ID of a target user as a key, and extracts users in a friend status with the target user (step S800). The shared-mission specifying unit 336 selects one of the users in the friend status, who have been extracted in step S800, in accordance with a certain criterion, for example, the user whose previous finishing date and time is most recent or whose previous finishing date and time is the oldest (step S802). The shared-mission specifying unit 336 refers to the user table using the user ID of the selected other user as a key, and specifies cleared missions for the selected user (step S804). Further, the shared-mission specifying unit 336 selects, out of the cleared missions which have been specified in step S804, the mission that has most recently been cleared, and specifies the selected mission as a mission to be shared (step S806).

When the number of users for which the shared missions are presented has not reached a certain upper limit yet (NO in step S808), the processing returns to step S802. On the other hand, when the number of users for which the shared missions are presented has reached the upper limit (YES in step S808), the shared-mission specifying unit 336 returns the missions specified thus far as shared missions to the listing unit 333 (step S810), and terminates the processing.

As has been described above, in the game system 1, the mission generating unit 332 generates separate missions and provides the generated missions to each of the users, and the mission exchanging unit 335 exchanges the missions on the mission list so that a chance for the user to select the missions increases, making it possible to maintain and increase the user's will to continue the game.

In the operation flow illustrated in FIG. 7A, once the exchange button 550 is pressed, the exchange button 550 will not be disabled as long as the presented missions are all cleared. However, even after being pressed, the exchange button 550 may be pressed many times within a certain period (e.g., 24 hours).

A computer program for causing a computer to execute the respective functions of the device processing unit 25 and the server processing unit 33 may be provided in a form recorded on a computer readable recording medium such as a magnetic recording medium or an optical recording medium.

It should be understood that various changes, substitutions, and modifications can be made to the present invention by those skilled in the art without departing from the spirit and scope of the present invention.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

The invention claimed is:

1. A method for providing a game, over a communication network, to a plurality of user devices via a server device, the method comprising:

transmitting over the communication network, to a first user device of the plurality of user devices, displaying information for presenting a list of a plurality of missions generated for a first user associated with the first user device, the list indicating each of the missions and an exchange element for changing a displayed mission to another mission to be presented in the list, the exchange element being enabled based on an execution status of the displayed mission; and updating the displaying information so that at least one of the missions included in the list is replaced with a second mission generated for the first user, when the exchange element is enabled.

2. The method according to claim 1, wherein, in response to the exchange element being enabled, the exchange element is selectable a plurality of times within a predefined time period.

3. The method according to claim 2, wherein, in response to the exchange element being selected, the exchange element remains enabled as long as the missions are cleared.

4. The method according to claim 2, wherein, in response to the exchange element being selected, the exchange element is disabled when a mission of the missions is uncleared.

5. The method according to claim 1, wherein the displaying information includes a mission of a second user who is in a friend status with the first user, the mission of the second user being different from the missions generated for the first user.

6. The method according to claim 1, wherein the list indicates an item associated with a mission that is acquirable by the first user by clearing the mission.

7. The method according to claim 1, further comprising:
generating a plurality of missions for each of a plurality of users; and
storing in a memory a plurality of relations between a plurality of items and the plurality of missions.

8. The method according to claim 7, further comprising:
receiving an identifier of an item from the first user device; and
identifying the second mission, which is a mission in which the item specified by the identifier is acquirable, based on the stored relations between the plurality of items and the plurality of missions.

9. The method according to claim 1, wherein
the displaying information includes data for displaying the exchange element in the presented list so that the first user can select the exchange element a plurality of times regardless of progress of the missions included in the presented list, and
the updating updates the displaying information each time the exchange element is selected.

10. A non-transitory storage medium having stored therein a control program for a server device providing a game, over a communication network, to a plurality of user devices, the control program, when executed by the server device, causes the server device to perform a process, the process comprising:
transmitting over the communication network, to a first user device of the plurality of user devices, displaying information for presenting a list of a plurality of missions generated for a first user associated with the first user device, the list indicating each of the missions and an exchange element for changing a displayed mission to another mission to be presented in the list, the exchange element being enabled based on an execution status of the displayed mission; and
updating the displaying information so that at least one of the missions included in the list is replaced with a second mission generated for the first user, when the exchange element is enabled.

11. The non-transitory storage medium according to claim 10, wherein, in response to the exchange element being enabled, the exchange element is selectable a plurality of times within a predefined time period.

12. The non-transitory storage medium according to claim 11, wherein, in response to the exchange element being selected, the exchange element remains enabled as long as the missions are cleared.

13. The non-transitory storage medium according to claim 11, wherein, in response to the exchange element being selected, the exchange element is disabled when a mission of the missions is uncleared.

14. The non-transitory storage medium according to claim 10, wherein the displaying information includes a mission of a second user who is in a friend status with the first user, the mission of the second user being different from the missions generated for the first user.

15. The non-transitory storage medium according to claim 10, wherein the list indicates an item associated with a mission that is acquirable by the first user by clearing the mission.

16. The non-transitory storage medium according to claim 10, wherein the process further comprises
generating a plurality of missions for each of a plurality of users; and
storing in a memory a plurality of relations between a plurality of items and the plurality of missions.

17. The non-transitory storage medium according to claim 16, wherein the process further comprises
receiving an identifier of an item from the first user device; and
identifying the second mission, which is a mission in which the item specified by the identifier is acquirable, based on the stored relations between the plurality of items and the plurality of missions.

18. The non-transitory storage medium according to claim 10, wherein
the displaying information includes data for displaying the exchange element in the presented list so that the first user can select the exchange element a plurality of times regardless of progress of the missions included in the presented list, and
the updating updates the displaying information each time the exchange element is selected.

19. A server device for providing a game, over a communication network, to a plurality of user devices, the server device comprising:
processing circuitry configured to
transmit over the communication network, to a first user device of the plurality of user devices, displaying information for presenting a list of a plurality of missions generated for a first user associated with the first user device, the list indicating each of the missions and an exchange element for changing a displayed mission to another mission to be presented in the list, the exchange element being enabled based on an execution status of the displayed mission, and
update the displaying information so that at least one of the missions included in the list is replaced with a second mission generated for the first user, when the exchange element is enabled.

20. The server device according to claim 19, wherein, in response to the exchange element being enabled, the exchange element is selectable a plurality of times within a predefined time period.

* * * * *